May 11, 1943.   K. PERKINS   2,319,156
PROCESS OF INLAYING AND MOLDING ARTICLES
Filed Jan. 23, 1940   3 Sheets-Sheet 1

Inventor
Kenneth Perkins

May 11, 1943. K. PERKINS 2,319,156
PROCESS OF INLAYING AND MOLDING ARTICLES
Filed Jan. 23, 1940 3 Sheets-Sheet 2
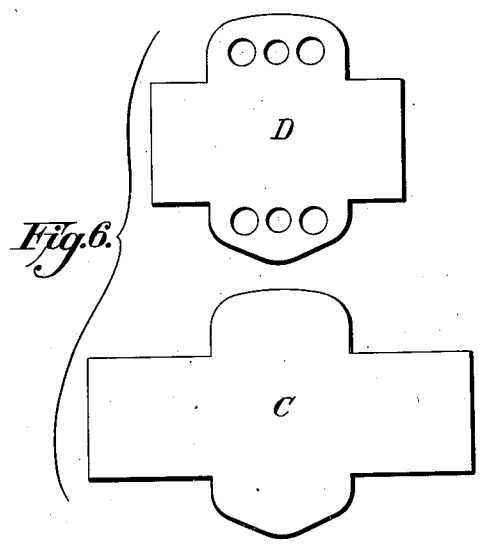
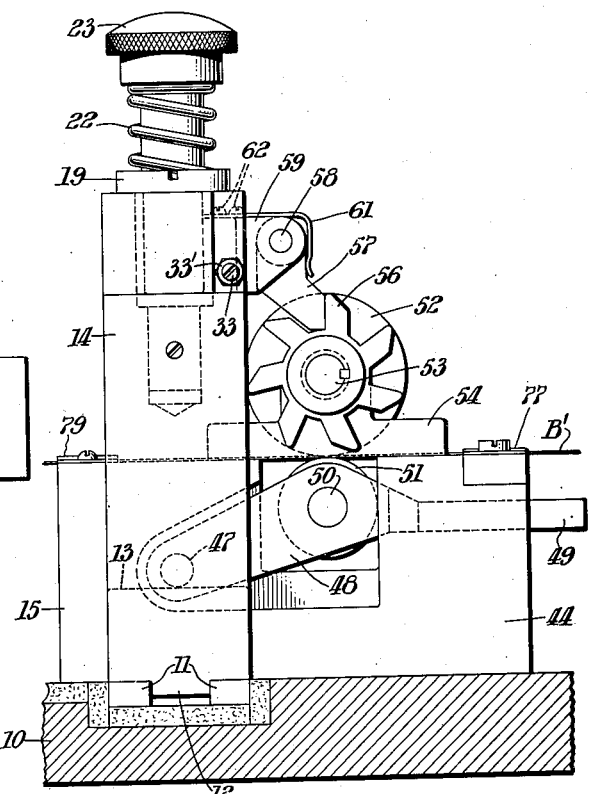
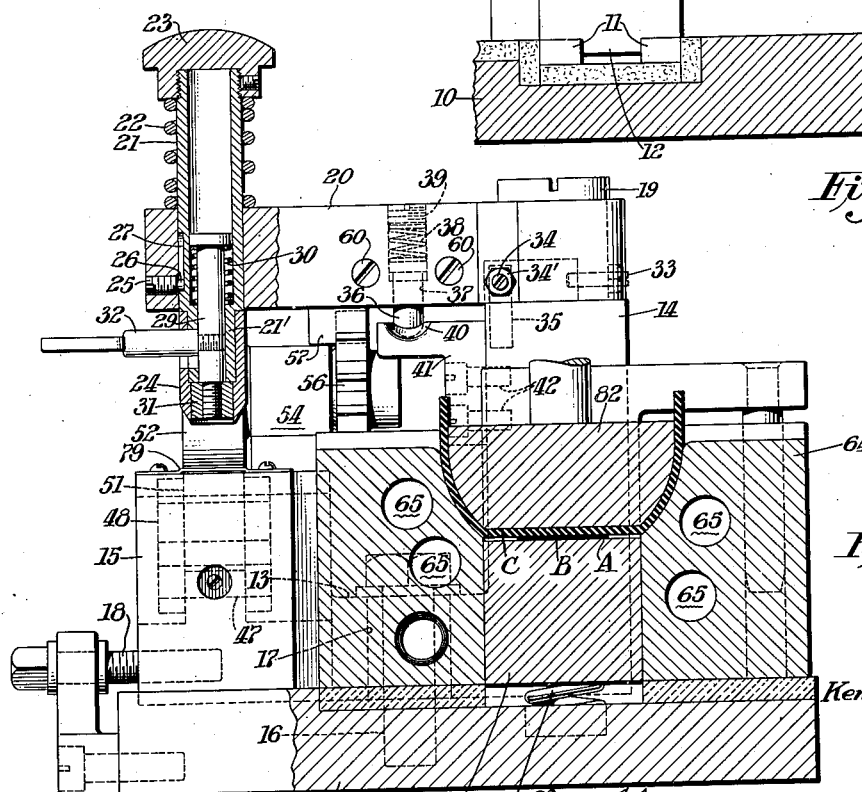
Inventor
Kenneth Perkins May 11, 1943.  K. PERKINS  2,319,156
PROCESS OF INLAYING AND MOLDING ARTICLES
Filed Jan. 23, 1940  3 Sheets-Sheet 3

Inventor
Kenneth Perkins
By Henry J. Miller
Attorney

Patented May 11, 1943

2,319,156

UNITED STATES PATENT OFFICE 2,319,156

PROCESS OF INLAYING AND MOLDING ARTICLES

Kenneth Perkins, Scotch Plains, N. J., assignor to The Singer Manufacturing Company, Elizabeth, N. J., a corporation of New Jersey Application January 23, 1940, Serial No. 315,866

5 Claims. (Cl. 18—61)

This invention relates to a process of making a moulded article and more particularly to the method of inlaying a name-plate or the like in a moulded article.

One of the objects of this invention is to inlay an element having openings in a plastic material and produce contrasting colors in selected ones of the openings.

Another object of this invention is to cause the parts used in making the article to adhere to each other so that they may be readily assembled in the mould.

With the above and other objects in view as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

In the drawings:

Figure 3 is a rear elevation of the device shown in Figure 1.

Figure 4 is a sectional view taken substantially along the line 4—4 of Figure 1.

Figure 6 is a top plan view of the two blanks used in making the moulded article.

Figure 1:
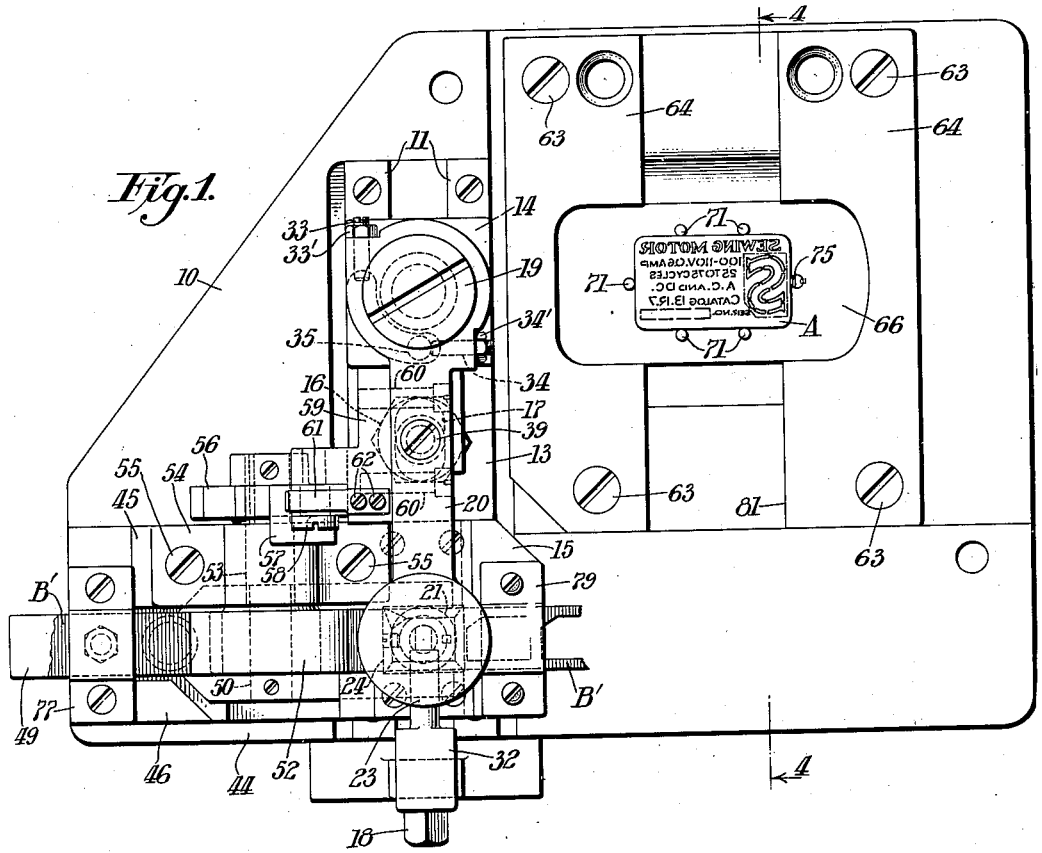
Figure 1 is a top plan view of a device suitable for initially assembling some of the parts that are used to make the article.

In the embodiment selected for illustration, a device suitable for use in carrying out the method comprises a base 10 provided with a track 11 (Fig. 1) which slidably receives the reduced portion 12 of a U-shaped member 13 having limbs 14 and 15. The member 13 is held on the base 10 by a screw 16 which passes through an elongated aperture 17 which is larger than the shank of the screw 16 and is adapted to be adjusted along the track 11 by the adjusting screw 18 when the screw 16 is loosened.

Pivotally secured by the pivot-screw 19 to the limb 14 of the U-shaped member 13 is one end of an arm 20 which carries at its other end a tube 21 which is adapted to be forced downwardly against the action of a coiled spring 22 by striking the head 23 with the hand (Fig. 4). The tube 21 has fixed to its reduced end 21' a cutter 24 formed with a substantially rectangular cross-section. The tube is limited in its longitudinal movement and prevented from rotating by the set-screw 25 which is threaded into the free end of the arm 20 and has a reduced end 26 which enters a groove 27 in the tube 21.

Carried on the inside of the tube 21 is a reciprocatory plunger 29 which is normally urged upwardly by a spring 30 which reacts against the head of the plunger 29 and the reduced portion 21' of the tube 21. The plunger 29 has an ejector 31 screw-threaded to its lower end and a finger-pin 32 threaded into its side and extending through slots in the cutter 24 and reduced end 21' of the tube 21.

Figure 2:
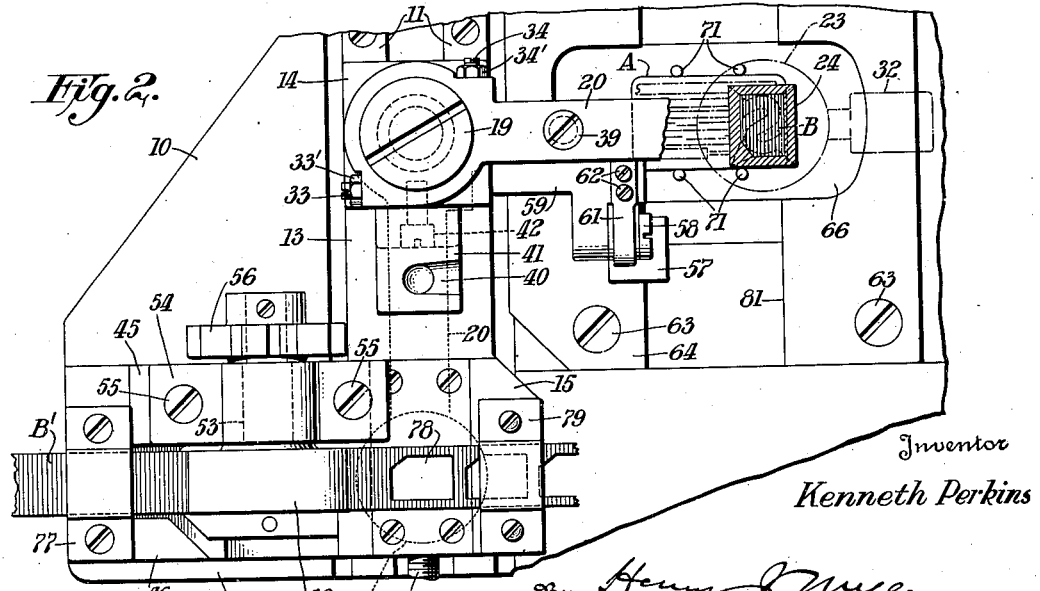
Figure 2 is a view similar to Figure 1 showing the method of placing colored plastic material in rear of the plate that is to be inlaid.

The arm 20 with the cutter is adapted to be swung from the position shown in dotted lines in Figure 2 to the position shown in full lines. To accurately position the arm 20 in these positions, arm 20 adjacent the pivot-screw 19 is provided with set-screws 33 and 34 which cooperate with a post 35 fixed to the limb 14 of the member 13. These set-screws may be adjusted and locked in their adjusted position by their respective lock-nuts 33' and 34'. The arm 20 is yieldingly held in the position shown in Figure 1 by a shouldered plunger 36 located in an aperture 37 in the arm 20 (Fig. 4) and urged downwardly by a coiled spring 38 which reacts against the top of the plunger 36 and the set-screw 39. The lower end of the plunger 36 cooperates with a depression 40 in the angle-piece 41 which is fixed to the limb 14 by the screw 42.

The limb 15 of the U-shaped member 13 is formed with an L-shaped extension 44 (see Figs. 3 and 5) the upstanding limb of which is formed by spaced lugs 45 and 46 (Fig. 1). Pivotally secured to the limb 15 by the pivot-pin 47 is a lever 48 having a hand piece 49 which extends between the spaced lugs 45 and 46.

Carried by the lever 48 is an axle 50 on which is rotatably mounted a roller 51, having its outer periphery covered with rubber or the like. Cooperating with the roller 51 is a second roller 52 which is fixed upon one end of a shaft 53. The shaft 53 is journaled in a bearing block 54 which straddles the space between the lug 45 and 46, the block being held in position by the screws 55.

Fixed to the other end of the shaft 53 is a ratchet-wheel 56 which is actuated by means of a pawl 57 pivoted at 58 to an L-shaped bracket 59 secured to the arm 20 by the screws 60. The pawl 57 is urged downwardly by a flat L-shaped spring 61 which is fixed to the arm 20 by the screws 62.

Figure 5:
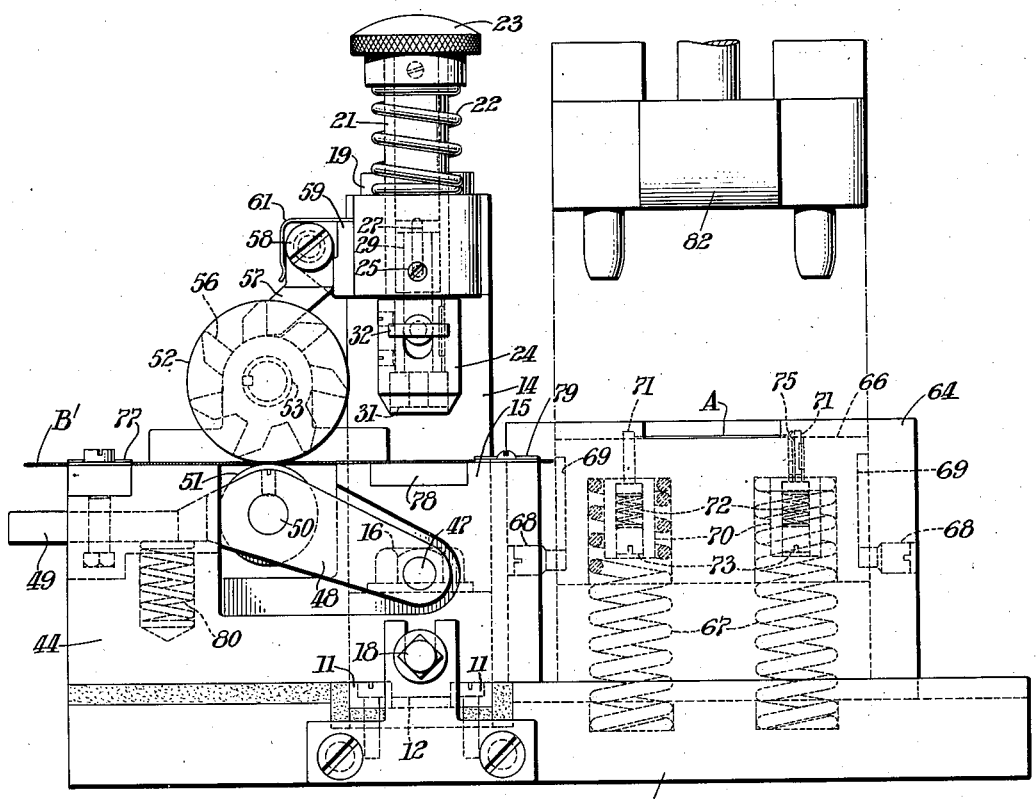
Figure 5 is a front elevation of the device shown in Figure 1.

Fixed to the base 10 by the screws 63 is a square shaped die 64 which is adapted to be heated through the openings 65 (Fig. 4) by electrical heating elements or any other suitable heating means. The die 64 is formed with a centrally arranged and substantially rectangular shaped opening which slidably receives a block 66 which is constantly urged upwardly by coiled springs 67 which react against the base 10 and the block 66 (Figs. 4 and 5). Set-screws 68 are located in the die 64 and their reduced ends enter grooves 69 located on opposite sides of the block 64 to limit its movement.

The upper ends of the springs 67 tightly embrace plugs 70 in which are located the plungers 71 resiliently urged upwardly by springs 72 which react against the set-screws 73 and the enlarged head of the plunger 71. There are six plungers 71 arranged as shown in Figures 1 and 2, and their upper ends extend slightly above the upper surface of the block 66. The upper ends of these plungers serve to accurately locate the stencil plate A, one of the plungers being provided with a flat spring 75 (Figs. 1 and 5) which urges the plate A against the plunger 71 located on the opposite edge so that one edge of the plate A is accurately located regardless of slight errors in the process of manufacture of the plates.

The device above described is used in my improved method of manufacturing articles from thermosetting material in the following manner. A roll (not shown) of paper of narrow width and impregnated with a resin carrying a pigment, is placed at the left of the device as illustrated in Figure 1 and supported in any suitable manner. The narrow strip of paper B' is led under the guide 77, between the rolls 51 and 52, over the anvil block 78, and under the guide 79. The operator places a stencil plate A, made from nickel, silver, or the like, between the pins 71 on the block 66 which is heated by conduction from the die 64. The hollow cutter 24 is actuated and in cooperation with the anvil 78 the cutter 24 cuts a substantially rectangular piece from the tape B' and the piece cut out remains in the hollow cutter 24. The arm 20 is swung about its pivot 19 until the screw 33 strikes the post 35 (Fig. 2) at which time the cutter 24 is directly over the large S in the plate A.

With the cutter in this position, the fingerpin 32 is depressed and the ejector 31 forces the piece B of the tape B' out of the cutter and into contact with the hot plate A, the pressure and heat causing the piece B to adhere to the plate A. The lever 32 is released and the arm 20 swung back to the position shown in Figure 1. When the lever 20 moves to the position shown in Figure 1, the pawl 57 actuates the ratchet-wheel 56 thereby causing the rollers 52 and 51, which frictionally grip the tape due to the action of the spring 80 (Fig. 5), to advance the tape over the anvil 78. The part C, shown in Figure 6, which is formed from a fibrous condensation product is then placed in the depression 81 in the die 64 and the upper die 82 (Fig. 5) is brought downwardly by hand, or any other suitable means, to the position shown in Figure 4.

It will be understood that when the die 82 descends the pins 71 are forced downwardly against the action of the springs 72 and the block 66 is then forced downwardly against the action of the springs 67 from the position shown in Figure 5 to that shown in Figure 4. These movements cause the part C to assume the shape shown in Figure 4 and the pressure and heat cause the parts A, B and C to adhere to each other and become, in effect, a single part.

Figure 7:
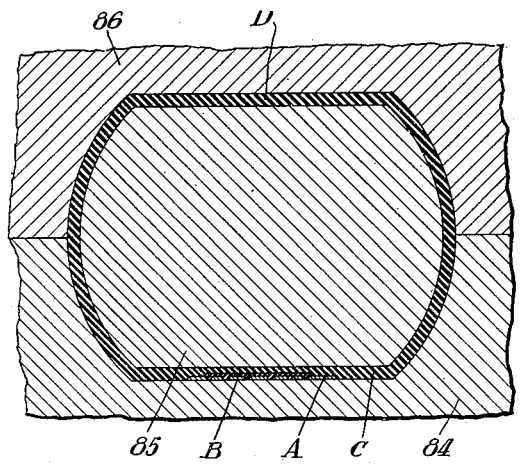
Figure 7 is a cross-sectional view of the mould showing the article in the mould.
Figure 8:
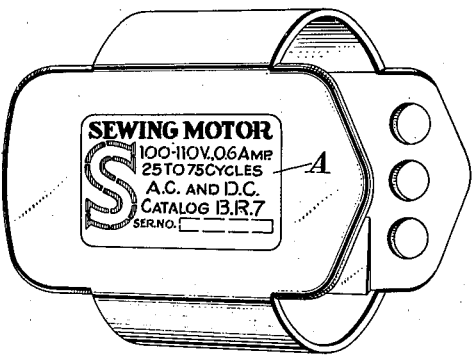
Figure 8 is a perspective view of the finished moulded article.

The die 82 is raised and the adhering parts A, B and C are placed in the lower half of the mould, indicated as 84 in Figure 7, and the core 85 is then placed in position. The blank marked D in Figure 6 is placed over the core 85 and the upper part 86 of the mould is moved into position and the parts thus assembled are subjected to heat and pressure. This causes the pigmented resin on the piece of tape B to flow into the openings of the letter S in the plate A and at the same time block out the entrance of the black thermo-setting material of the part C, the other openings in the plate A being filled with the black material. The ends of the blanks C and D flow together and unite. The product is then complete, and upon removal from the mould is as indicated in Figure 8.

From the foregoing description it will be observed that the thin tape B carrying the pigmented resin can be accurately placed in the desired position upon the stencil plate and that the thin coating of resin will not extend to other than the selected ones of the characters cut into the plate to be inlaid. Further, the smooth finish of the body of the article, the shining nickel plate and the different colors showing through the stencil produces a pleasing effect.

Having thus set forth the nature of the invention, what I claim herein is:

1. Method of inlaying a plate having opening in a moulded article which consists in placing a thin tape coated with a resin carrying a pigment on the face of the plate which is to become invisible and over selected ones of the openings of the plate, subjecting the plate and tape to heat to cause them to adhere, assembling the plate with the tape adhering thereto in a mould with a thermo-setting compound and subjecting the assembly to heat and pressure until all of the parts are united and the pigmented-resin flows into the selected openings.

2. Method of inlaying a plate having openings in a moulded article which consists in placing on one face of the plate a piece of material which is adhesive when heated and carries a pigment, applying heat to the plate and material to make them adhere, assembling the plate and material in a mould with the other face of the plate in contact with the face of the mould and with a thermo-setting compound in back of the pigmented material and plate and subjecting the assembly to heat and pressure until all the parts are united and the pigmented-material flows into the openings.

3. Method of inlaying a plate formed with openings in a moulded article which consists in adhesively applying to one face of the plate a sheet of pigment carrying material so as to cover selected ones of said apertures, assembling the plate and adhesively applied material with the uncovered face of the plate in facial contact with the face of a mould and with a mass of thermo-setting compound against the covered face of the plate and subjecting the assembly to heat and pressure until the pigmented material enters the openings in the stencil plate and a composite article is produced.

4. Method of producing a moulded article with a metallic stencil plate inlaid therein which comprises, cutting a piece of resin impregnated tape from a continuous strip, placing the piece of tape on one of the faces and over selected ones of the perforations in the stencil plate, applying heat to the piece of tape and plate to cause them to adhere, assembling the piece of tape and the other plate in a mould with the face of the plate in contact with one face of the mould, placing blanks of thermo-setting compound in the mould over the piece of tape and plate and subjecting the assembly to heat and pressure until the thermo-setting compound in the tape and blank enter the openings in the stencil plate and become level with the face of the plate.

5. Method of producing a moulded article with a metallic stencil plate inlaid therein which comprises cutting from a continuous strip of thin pigmented carrying material a piece smaller than the plate, placing the piece of material on one of the faces of the stencil and over selected ones of the openings in the stencil, subjecting the plate and piece of material to heat to cause them to adhere, bending a preformed blank of fibrous thermo-setting material of a different color than the color of the pigmented material and simultaneously forcing the blank into contact with the tape and applying heat to cause these parts to adhere, placing the assembly in a mould with another blank consisting of fibrous thermo-setting material and subjecting the entire assembly to heat and pressure until all of the parts are united and the pigmented material flows into selected ones of the openings in the stencil plate and the thermo-setting compound flows into the remaining openings in the plate.

KENNETH PERKINS.